J. R. Brown,
Screw-Threading Machine,
N°. 46,521. Patented Feb. 21, 1865.
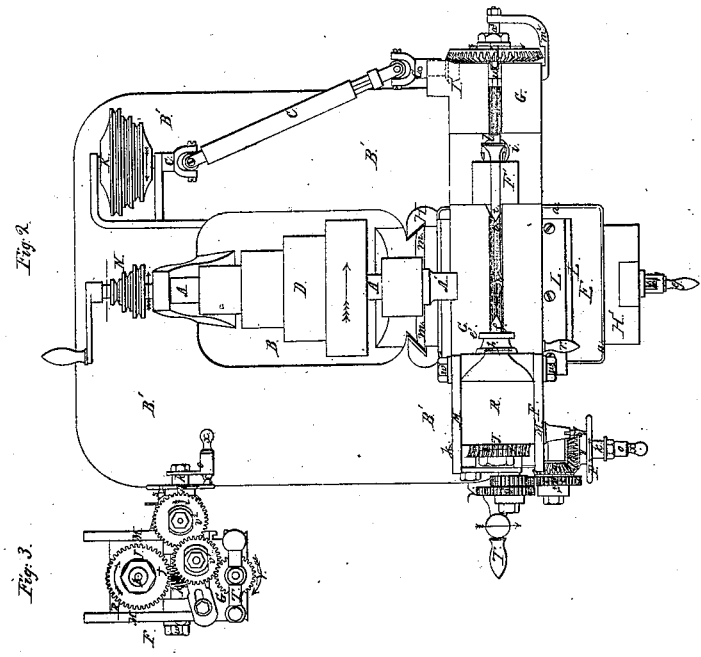
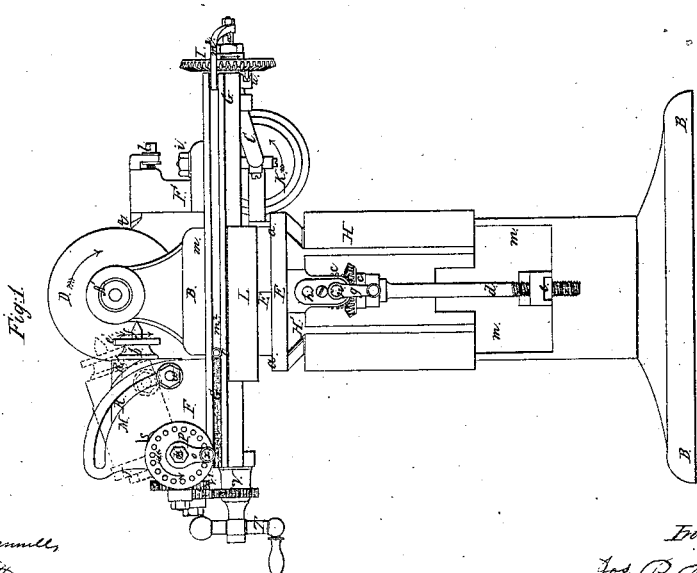
Witnesses:
Isaac A. Burnell
Samuel Barrett
Inventor:
Jos. R. Brown

UNITED STATES PATENT OFFICE.

JOSEPH R. BROWN, OF PROVIDENCE, RHODE ISLAND, ASSIGNOR TO J. R. BROWN & SHARPE, OF SAME PLACE.

IMPROVED MILLING-MACHINE.

Specification forming part of Letters No. 46,521, dated February 21, 1865.

*To all whom it may concern:*

Be it known that I, JOSEPH R. BROWN, of Providence, in the county of Providence and State of Rhode Island, have invented certain new and useful Improvements in Milling-Machines; and I do hereby declare that the following is a full, clear, and exact description of the same, reference being had to the accompanying drawings, making part of this specification, in which—

Figure 1 is a front elevation of my improved machine. Fig. 2 is a plan of the same; and Fig. 3 is an end elevation of the geared head on the carriage detached.

Similar letters of reference indicate corresponding parts in all the figures.

My invention consists in an improved construction and arrangement of certain devices for holding and presenting the work to be performed to a revolving cutter or milling-tool that is calculated to adapt the machine to a great variety of work and insure convenience of operation.

In the drawings, B is a cast-iron column, serving as a frame for the machine, having a broad, flat base, B', by which it is fastened down to insure solidity and firmness, and upon the top of this column is formed suitable bearings for the revolving cutter-head, consisting of a spindle, A, provided with cone-pulleys D, by which it is revolved by means of a suitable belt or band at different speeds suited to the nature of the work to be performed. The end A' of the spindle is made hollow, to provide for the reception of the arbor upon which the cutters or mills are secured, which, owing to the solidity of the spindle-bearings, revolve with great firmness and accuracy.

The piece of work to be operated upon may be held either in a vise or clamping-jaws, or between two centers or in a chuck, according to its nature and requirements, either device being conveniently arranged on the sliding swiveling-carriage G, and in order to insure firmness in the said carriage it is mounted upon a heavy knee, H, of cast-iron, that is secured to and slides vertically upon a projecting plate, *m*, cast upon the front of the column B. This knee H is adjusted to its proper elevation by means of the screw *d*, which is turned for that purpose in the nut *e*, projecting from the front of the column, by means of the crank *g* in front, on the end of the rod *n*, which is connected to the screw by the bevel-gears C C. The upper portion, H', is formed with a slide, to which is fitted the sliding plate E, which is formed with a ledge, *a*, at its margin to serve as a dripping-pan to receive the oil that is applied to and drips from the work, and this sliding plate is moved in a direction parallel to the axis of the spindle A, and adjusted by means of a screw operated by a crank on the stem *h*. This sliding plate affords a broad and firm bearing for the swivel-plate L, in which the carriage G slides, and by means of which the said carriage, turning on the swivel, is set to slide at any convenient angle that may be required.

The construction and arrangement of the parts, as above described, provides for the elevation of the carriage G, for its sliding longitudinally with the spindle of the cutter-head, and for setting it so as to slide at any convenient angle therewith, so that every possible movement or position thereof is obtained that is required for any work that can be performed by a machine of this character.

The machine is represented in the drawings with two center-heads, F F'; mounted on the carriage G, the greater proportion of the work which this machine is adapted to do being swung upon or held between two centers, as in a lathe. The center-head F is made stationary at the end of the carriage, and is provided with a hollow spindle, *b*, in which is inserted the line-center *f*, formed with a slotted plate, *e'*, in which the tail of the "dog" is inserted for the purpose of turning the arbor or work to which such dog is fastened with the line-center spindle. The center-head F' is fitted to slide longitudinally on the carriage to the position required for holding the work, in which it is secured by the nut *i*. In this head the dead-center *t* is fitted and adjusted to hold the work by means of the screw *l*. The hollow spindle of the line-center head F is provided with a worm-wheel, J, secured by a nut on its rear end, as shown in Fig. 3, and a worm-gear, *j*, on the spindle K, having a crank, *o*, by means of which the said spindle and its center are revolved, and the spindle K is provided with an index-plate, *p*, turning freely thereon, by which to divide the revolution of the center-spindle, and a stop, S, Fig. 2, consisting of a sliding pin in a barrel firmly secured to the side of the head, which enters one of the perforations in the index-plate to hold it stationary, and the crank o is furnished with a sliding pin, x, the pointed end of which is pushed into one of the perforations in the index-plate after the crank-spindle and worm have been turned to produce the desired division of the revolution of the center-spindle for the purpose of holding the whole mechanism stationary while the cutter or mill is operating on the work that is held between the centers. A piece of work—as, for instance, a rimmer or a spur-gear in an arbor—being confined between the centers in the usual way and properly adjusted by the means above described to present it to the cutter or mill on the cutter-head, the carriage G is moved laterally in the swivel-plate L, to feed the work to the cutter by means of a feeding-screw arranged beneath the carriage and provided with a crank, T, at one end, by which it is turned and the position of the carriage adjusted by hand, and a sliding clutch, u, at the opposite end thereof, engaging with jaws formed on the hub of the bevel-gear I, Figs. 1 and 2, which is connected by a smaller bevel-gear, I', (in dotted lines,) to the universal-jointed shaft C, the opposite end of which is provided with cone-pulleys K, which are revolved by means of a band from the cam-pulleys N, on the rear end of the spindle A at the speed required by the nature of the work, the said clutch being thrown in and out of gear, when desired, to feed steadily by power by means of the spindle $a^3$, connecting with the clutch and protruding from the end of the screw, which is made hollow for its reception, the protruding end being connected by a nut thereon to the sliding rod $m^2$, having a convenient handle, r, thereon, by which it is moved.

By means of the gear I and its connections the feeding movement of the carriage is produced, carrying the work in the direction of its length up to the cutter.

I have thus far described the revolving movement of the center-spindle b and the sliding feeding movement of the carriage G as separate functions operating separately. It is, however, desirable in doing certain kinds of work—as, for instance, in cutting spiral grooves, in making "twist-drills," and similar tools—to combine these two functions, so that with a certain extent of the sliding movement of the carriage the center-spindle, and with it the work attached thereto, will make a certain degree of revolution, the two working conjointly to feed the work to the cutter to produce the effect described of spiral cutting or milling. This result is produced by means of the spur-gear V on the screw, Figs. 2 and 3, connecting the motion of the latter through the medium of the intermediate spur-gears, $v'$ $v^2$, and bevel-gears $y$ $y$ with that of the index-plate p on the worm-spindle k, which is connected and its movement communicated to the worm-spindle by inserting the sliding pin x of the crank o in one of the perforations of the index-plate, as shown in Fig. 3, so that the crank o and the worm-spindle will revolve with the index-plate, the proper ratio of velocity between the worm-spindle and the feeding-screw of the carriage G being obtained by suitable changes of the intermediate gears, by which their movements are connected, as described. The block R, in which the center-spindle b is held, swings upon the worm-spindle k from the horizontal position shown into a vertical position or any intermediate angle between the same, it being secured and held stationary in such position by means of the bolt w and its nut, passing through the block and the curved slots formed in the two side pieces, M, and the center-spindle being while in a vertical or oblique position still subject to the action and control of its worm-wheel and worm and the index-plate, as above described. By this means spur and bevel gears fixed on a stud inserted in the hollow spindle in place of the center may be cut by using the elevating-screw d as a feeding-screw to feed the work to the cutter by a vertical movement. By means of this arrangement, also, the line-center f can be raised or depressed to cut the blades of tapering reamers, burrs, milling-cutters, &c. A chuck having adjustable jaws may be secured upon the protruding end of the line-center spindle b, and a rod of metal that is too long to be held between the centers gripped and held by the jaws of the chuck and revolve with the spindle b, subject to the movement and regulating devices above mentioned.

The construction and arrangement of a suitable vise or clamping-jaws upon the carriage G will be readily understood by mechanics who are familiar with machines of this character and need not therefore enter into this description.

What I claim as my invention, and desire to secure by Letters Patent, is—

1. The combination of the elevating-knee H, the sliding plate E, the swivel-plate L, and sliding carriage G with the revolving cutter-head, constructed and arranged to operate substantially as described.

2. The arrangement of the center-spindle b, or its equivalent, with the devices which actuate and govern the movements of the same, in combination with the sliding carriage G and the devices by which it is operated, so that the two mechanisms may operate either separately or conjointly, substantially in the manner described.

3. The arrangement within the center-head F of the swinging block R, or its equivalent, and the revolving spindle b with the devices which operate the same, substantially as described, for the purpose specified.

JOS. R. BROWN.

Witnesses:
ISAAC A. BRUNELL,
SAMUEL BARRATT.